United States Patent Office 3,471,090
Patented Oct. 7, 1969

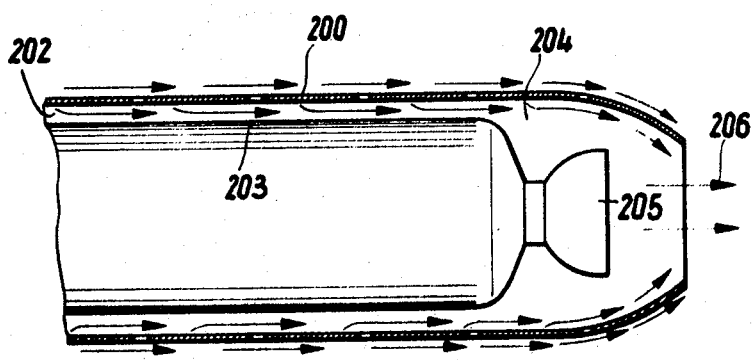

3,471,090
BOUNDARY LAYER CONTROL MEANS
Hermann Papst, St. Georgen 7742, Black Forest, Germany
Continuation-in-part of application Ser. No. 534,890,
Mar. 16, 1966, now Patent No. 3,348,622. This
application Feb. 13, 1967, Ser. No. 615,828
Claims priority, application Germany, Dec. 24, 1962,
P 30,859
Int. Cl. B64d 33/04; F02k 1/22
U.S. Cl. 239—127.1          8 Claims

ABSTRACT OF THE DISCLOSURE

A jet propulsion engine having an outlet nozzle and being surrounded by covering means which has an outer side. The covering means which is a skin or similar member is provided with a plurality of angularly spaced foramina and comprising a portion extending rearwardly to the outlet of the engine. A boundary layer forming along the outer side of the skin is aspirated into the foramina and guided by the skin and the rearwardly extending portion in such a manner that the boundary layer is directed into parallel flow with the outer layer of the stream of hot gas issuing from the outlet of the engine, thus interposing the boundary layer at least partly between such outer layer of hot gas and the skin.

CROSS-REFERENCES TO RELATED APPLICATIONS

This is a continuation-in-part of my co-pending application Ser. No. 534,890, filed Mar. 16, 1966, now U.S. Patent 3,348,622 and entitled "Boundary Layer Control Means and Method of Producing the Same."

BACKGROUND OF THE INVENTION

The present invention relates to boundary layer control means and more specifically, to a boundary layer control means for engines of the type utilizing the propellant action of expanding gases. Still more specifically, the invention relates to a boundary layer control means for such an engine which utilizes the propellant action of hot expanding gases.

The problems which arise as a result of the fact that a thin layer fluid develops along the exposed surfaces of fuselages, wings, propeller blades and vanes and similar profiled bodies are well known to designers of vehicles, blowers and turbines. Attempts to utilize porous skins have met with little success because the pores will become clogged at comparatively short periods of exposure to a fluid stream and because such pores reduce the smoothness of the skin so that the fluid stream meets greater resistance even if the boundary layer is eliminated. Also, a porous skin is weaker than a non-permeable skin.

These problems, which have long been recognized in the art, are particularly critical in vehicles which are required to attain a very high speed in a fluid stream. This is true of fast-flying aircraft, and most particularly of flying craft which must pass through the earth atmosphere at extremely high speeds, for instance rockets required to attain escape velocity. In flying craft of this type any reduction which can be accomplished at all in the drag resulting on the craft from the boundary layer developing along the skin of the craft can mean a saving of fuel amounting to hundreds and perhaps thousands of pounds. Evidently, a reduction in the amount of fuel the craft is required to carry will permit an increase in the payload, an important consideration in the present relatively unsophisticated state of extra-terrestial flight.

It is therefore evident that the elimination of the boundary layer which latter causes this drag, is of prime importance in the industry.

However, other considerations are presently troubling those who are working in this field. It is well known that the extreme heat developed by rocket engines is highly destructive of the material of the engine components. This is of relatively little consequence in engines used on non-recoverable vehicles, that is on vehicles used for orbital insertion or for intra-system missions. In such cases the engine is usually required to perform its propelling function only once, and it is of course constructed to stand up for the necessary length of time.

With the increasing emphasis on orbital laboratories, that is on manned space stations which are to orbit the earth just beyond the atmospheric layer, it is becoming important to develop shuttle vehicles for delivering personnel and supplies to such stations, and for removing personnel and supplies therefrom to be returned to earth. Evidently, such shuttle vehicles are intended for repeated use over a prolonged period of time and quesions of economies forbid the development of vehicles requiring the installation of a new propulsion plant for each such flight. This means, in other words, that the propulsion system used must be capable of withstanding repeated use and must therefore be protected as much as possible from the destructive influences of the hot gases developing during such uses.

SUMMARY OF THE INVENTION

The present invention overcomes the disadvantages set forth above, and provides the advantages and conditions which have been outlined as desirable.

In particular, the present invention makes it possible to provide a propulsion plant, such as a jet-propulsion engine which will be free from or be substantially unaffected by drag developing during rapid movement of such a plant during a flight.

This is accomplished by completely or at least substantially eliminating the boundary layer which forms along the propulsion plant.

Furthermore, the present invention makes it possible to utilize the boundary layer as a means of protecting certain component parts of the propulsion plant against the destructive influence of hot gases which develop during use of the propulsion plant for propelled flight.

In accordance with one feature of my invention I provide, in a jet-propulsion engine, the combination of exhaust nozzle means from which a stream of hot gas issues during operation of the engine, and tubular inner wall means which extends forwardly of the nozzle means. I further provide tubular outer covering means which surrounds the wall means spaced therefrom so as to define therewith at least one channel. This covering means has an outer side exposed to the stream of surrounding fluid and is provided with a plurality of angularly spaced foramina so that the boundary layer of the stream of surrounding fluid may enter the aforementioned channel through the foramina for movement in the channel towards the exhaust nozzle means. In accordance with the invention the tubular outer covering means comprises a portion extending rearwardly of the exhaust nozzle means in such a manner that the rear edge of the tubular outer covering is located adjacent to at least the outer layer of the stream of hot gas which issues from the exhaust nozzle means. By this arrangement the boundary layer aspirated through the angularly spaced foramina into the channel is guided into substantially parallel flow with the outer layer of the stream of hot gas and is thus at least partly interposed between such outer layer and the tubular outer covering means, protecting the same from the destructive effects of the stream of hot gas.

An additional advantage of this arrangement besides the elimination of drag caused by the boundary layer and the protection of the outer covering means from the destructive effects of the hot gas, resides in the fact that such an "air-breathing" engine develops increased thrust. The reason for this is that the thermal energy of the hot gases issuing from the exhaust nozzle of the engine serve to heat the aspirated boundary layer which in turn facilitates after-burning of not fully combusted combustible products, and which results in increased thrust.

Of course, when a propulsion plant of this type passes beyond the earth atmosphere it will then continue to operate in a well known manner as a pure rocket engine since evidently there is no longer any boundary layer to aspirate. Although the increase in the thrust of the propulsion plant is by no means the only consideration behind the present invention it is, nevertheless, believed on the basis calculations that an engine so constructed will be capable of raising a payload up to ten times that of a propulsion engine of conventional type.

The novel features which are considered as characteristic for the invention are set forth in particular in the appended claims. The invention itself, however, both as to its construction and its method of operation, together with additional objects and advantages thereof, will be best understood from the following detailed description of specific embodiments when read in connection with the accompanying drawings.

BRIEF DESCRIPTION OF THE DRAWING

The single figure is a section through the tail end of a jet-propulsion engine embodying my present invention.

DESCRIPTION OF THE PREFERRED EMBODIMENT

Discussing now the drawing in detail, it will be seen that there is shown a portion of a jet-propulsion engine wherein a tubular outer covering or skin 200 comprises circumferentially extending slots 201. However, it is to be noted in this context that the apertures 201 need not necessarily be slots, but can be identified as foramina in general. A tubular inner wall 203 is provided on the engine and defines with the outer covering 200 channels 202 which convey boundary layer aspirated through the foramina 201 into the space 204 located downstream as well as upstream of the exhaust nozzle 205. The jet 206 of exhaust gases issuing from the nozzle 205 creates suction which is felt in the vicinity of the nozzle 205 and in the channels 202 and which serves to draw the boundary layer 201. This suction is sufficiently strong to remove the boundary layer by aspiration of the same through the foramina 201 and in turn this reduced or completely eliminates the drag upon the jet-propulsion engine. The fact that the outer covering 200 surrounds and extends beyond the exhaust nozzle 205 contributes greatly to stronger suction in the channels 202. Furthermore, this portion of the outer covering 200 which so surrounds and extends beyond the exhaust nozzle 205 serves the additional purpose, as is clearly evident from the figure, of guiding the aspirated boundary layer into substantially parallel flow with the outer laminar layer of the gas stream 206 which issues from the nozzle 205. Thus, since the aspirated boundary layer is of course much cooler than the gas stream 206, it serves in effect as an insulating layer between the gas stream 206 and the inner surface of the outer covering 200 in the region in which the same surrounds the exhaust nozzle 205 and extends rearwardly thereof. Thus, damage to the outer covering 200 in this region is at least significantly reduced if not entirely eliminated.

It will also be evident that, as pointed out earlier, the admixture of the aspirated boundary layer which eventually takes place with at least the outer laminar layer of the gas stream 206 causes heating up of the thus admixed boundary layer and also introduces additional oxygen into the stream 206 of hot gas. Since this exhaust stream 206 always contains partly or completely unburned combustible products, this heating of the boundary layer and the addition of oxygen to the gas stream 206 results in complete combustion of such products and it is evident that this will increase the thrust capability and the efficiency of a jet-propulsion engine constructed in accordance with my invention.

Of course, the foramina 201 can be provided in various different ways, which have been set forth in my earlier mentioned copending application. It is to be pointed out, in the present application, that these foramina can have the form of slots or other configurations and that it is advantageous to have the cross section of these foramina increase or diverge in the direction from the outer to the inner side of the outer covering 200. The purpose of this is to assure that any matter which enters into such foramina with the boundary layer cannot settle in the foramina, clogging the same, but will be carried away by the boundary layer so that the efficiency of my boundary layer control means cannot be impaired in this manner.

It will be understood that each of the elements described above, or two or more together, may also find a useful application in other types of applications, differing from the types described above.

While the invention has been illustrated and described as embodied in a jet-propulsion engine, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. In a jet-propulsion engine, in combination, exhaust nozzle means from which a stream of hot gas issues during operation of the engine; tubular inner wall means extending forwardly of said nozzle means; tubular outer covering means surrounding and spaced from said wall means so as to define therewith at least one channel, said covering means having an outer unobstructed side side exposed to the stream of surrounding fluid and comprising a portion extending rearwardly of said exhaust nozzle means in such a manner that the rear edge of said tubular outer covering is located adjacent to at least the outer layer of a stream of hot gas issuing from said exhaust nozzle means; and a plurality of boundary layer aspirating foramina located in said covering means, some of said foramina being spaced from each other in circumferential direction and some of said foramina being spaced from each other in axial direction of said tubular outer covering means, said foramina being operative for aspirating the boundary layer of the stream of surrounding fluid into said channel for movement in the latter and into substantially parallel flow with the outer layer of the stream of hot gas.

2. A combination as set forth in claim 1 wherein said channel has an open end adjacent to said nozzle means so that suction normally developing in the vicinity of said nozzle means draws the boundary layer through said foramina.

3. A combination as set forth in claim 1, wherein said foramina are slots.

4. A combination as set forth in claim 3, wherein said slots diverge in width inwardly away from said outer side so that the boundary may enter said channel through said slots at an angle of less than 90 degrees.

5. A combination as defined in claim 4, wherein said slots extend transversely of the direction of propulsion of said jet-propulsion engine.

6. A combination as defined in claim 5, wherein said slots extend substantially circumferentially of said covering means.

7. A combination as defined in claim 4, wherein the width of said slots at said outer side of said covering means is in the range of up to 1 mm.

8. A combination as defined in claim 1, wherein said portion of the covering means which extends rearwardly of said exhaust nozzle means is arranged so as to guide a portion of the boundary layer into the stream of hot gas for admixture therewith and combustion therein.

References Cited

UNITED STATES PATENTS

| | | | |
|---|---|---|---|
| 2,986,602 | 5/1961 | Ferri | 239—127.3 |
| 3,003,311 | 10/1961 | Hall | 239—127.1 |

EVERETT W. KIRBY, Primary Examiner

U.S. Cl. X.R.

239—265.11